United States Patent [19]
Schloesser et al.

[11] Patent Number: 5,839,954
[45] Date of Patent: Nov. 24, 1998

[54] SWEET CORN PROCESSING SYSTEM

[75] Inventors: Alvin J. Schloesser; Christopher M. Schloesser, both of Watertown, Wis.; Jon F. Mollnow, Perry, N.Y.

[73] Assignee: Byron Enterprises Inc., Byron, N.Y.

[21] Appl. No.: 740,039

[22] Filed: Oct. 23, 1996

[51] Int. Cl.$^6$ .............................. A01D 45/02; A01F 11/06
[52] U.S. Cl. .............................. 460/45; 460/42; 460/119; 460/901; 56/64
[58] Field of Search .............................. 460/45, 42, 119, 460/114, 48, 901, 49, 50, 51, 52, 53, 54, 55, 56, 57; 56/64, 94, 103, 119

[56] References Cited

U.S. PATENT DOCUMENTS

| | | | |
|---|---|---|---|
| 3,628,316 | 12/1971 | Rea, Sr. | 56/13.3 |
| 3,791,117 | 2/1974 | Lawrence | 56/13.9 X |
| 4,225,031 | 9/1980 | Frisbie et al. | 198/395 |
| 4,413,722 | 11/1983 | Frisbie et al. | 198/392 |
| 4,845,930 | 7/1989 | Dow | 56/113 |
| 5,176,573 | 1/1993 | Dow | 460/42 |

*Primary Examiner*—Terry Lee Melius
*Attorney, Agent, or Firm*—M. LuKacher; K. LuKacher

[57] ABSTRACT

A system for processing freshly picked ears of sweet corn in the field. In the preferred embodiment, a portable, towable processing machine having an on-board hydraulic power system includes a hopper for receiving whole ears, a husking bed for removing the husks, a bucket elevator for raising the husked ears to an upper level, a plurality of kernel cutting machines for cutting kernels from the ears, scalping beds for separating cut kernels from cutting debris, and a hopper for receiving and storing the cut corn and for delivering it to another vehicle or receptacle. The ears and kernels are moved through the machine by an integrated system of conveyors and bucket elevators. The conveyors and the cutting machines are so arranged that a stream of ears is recirculated past entrances to the machines, which are arranged in parallel flow so that any ear may be presented for kernel removal to any cutting machine. Ears enter the first available cutting machine they encounter. Preferably, the processing machine is towed by a self-propelled, multiple-row corn harvesting head which expels picked whole ears directly into the processing machine. An advantage over singulated harvesting/processing machines is that the number of kernel cutters can be greater than the number of row pickers supplying them, allowing more rapid harvesting of corn ears since the maximum harvesting rate is equal to the combined maximum cutting rate of all the kernel cutting machines. Preferably, the machine is sufficiently compact to be trailered on a standard flatbed trailer over roads and highways without need for oversize or overweight permits or special routings.

22 Claims, 12 Drawing Sheets

SWEET CORN PROCESSING SYSTEM

DESCRIPTION

The present invention relates to systems (methods and apparatus) for the harvesting of sweet corn, and particularly to an integrated system adapted to be provided on a single trailable vehicle which operates in corn fields for providing cut kernel corn from whole corn ears while returning the cobs and husks back to the field where they can be recovered as silage or plowed under for soil conditioning.

The present invention is especially suitable for providing a field harvester which operates in the corn field as a processing machine for receiving freshly picked ears from an accompanying corn harvesting machine, by which it may be drawn. By "processing" herein is meant the methods and apparatus required to convert whole ears of corn into cut kernels, cobs, husks, and remnant stalks, and to separate and direct these plant components to their appropriate destinations. The processing machine has a husking bed for receiving whole ears and removing husks therefrom, and a pooled array of corn kernel cutting mechanisms and associated conveyors for moving ears and cut kernels within the machine and for recycling any ears which need to be diverted from the cutting mechanisms. A self-leveling tracked chassis carries all of the foregoing and other components within spatial parameters (height, length, and width) so as to have a total weight and size such that the machine can be drawn through the field and can also be carried on a flat-bed trailer allowing sufficient clearance to travel on public roads between fields without requiring special routes and permits because of weight and height restrictions applicable to vehicles traveling along such roads. The invention and various elements thereof may find application wherever environmental protection considerations, similar to those confronting sweet corn processing, and requirements for portability and size exist.

The harvesting of sweet corn imposes particularly stringent requirements in order to protect the harvested corn from damage, since piercing, bruising, and other damage to kernels can prevent the sweet corn from being acceptable to consumers. While field corn, where the kernels are hard, can be harvested in the field by scraping the kernels from the cob, sweet corn is generally harvested as ears containing their protective husks. Typically, the husks are removed and the kernels cut from the cobs in a fixed processing plant which may be remote in distance and time from the point of harvest. Because sweet corn quality deteriorates rapidly after picking, it is highly desirable that it be processed as soon as possible, preferably directly in the field. The disposal of husks and cobs, particularly under present-day environmental protection laws and regulations, is difficult and expensive. It is also highly desirable to leave the husks and cobs and any remnant stalks in the field where they can be recovered for silage or plowed under to condition the soil for subsequent plantings.

A self-propelled field harvesting vehicle for integrated picking, husking, and kernel cutting of fresh sweet corn in the field is disclosed in U.S. Pat. No. 5,176,573 issued Jan. 5, 1993 to Dow, which is hereby incorporated herein by reference. The disclosed invention employs a plurality of complete ear picking and processing units arranged (or "ganged") in parallel, wherein each unit picks and processes the ears from a single row of corn stalks in a plurality of rows of corn. Such an arrangement of the harvesting and processing apparatus is termed "singulation." This machine usefully permits the immediate field processing of freshly picked sweet corn ears, greatly enhancing the consumer quality of the kernels, and provides for immediate return of all non-food byproducts of harvesting directly to the field.

A machine in accordance with the '573 invention is limited in harvesting speed (rate of advance in the field) by the density of ears in the most densely-eared row of corn being picked. Adjacent units which are simultaneously picking adjacent rows of lower ear density therefore may be underutilized. There is no mechanism for readily presenting all of the ears equally to all of the kernel cutting machines to equalize, and thereby maximize, the operating load (the rate of ear input to kernel cutting operations). Further, such a machine is limited in harvesting speed by having only a single kernel cutter dedicated to each picker, the pickers generally being able to provide ears to their assigned cutters faster than the cutters can process the ears. The operational speed of the cutters, therefore, can become the mechanical limit to rate of harvest. Adding one or more additional kernel cutters to each picking/processing unit can make the length and weight of the machine unacceptable for in-field and over-the-road travel. Further, each such added cutter can represent an unneccesarily large quantum of added kernel cutting capacity, and this capacity must be provided for every one of the plurality of pickers.

It is the principal object of the invention to provide an improved system for pooling of husking and kernel cutting operations in a single sweet corn processing machine operative in a corn field so that the output from all the row pickers of an associated corn harvesting machine can be distributed to all the kernel cutters.

It is a further object of the invention to provide an improved system for pooling of husking and kernel cutting operations in a single sweet corn picking and processing machine having a first plurality of row pickers and a second and larger plurality of kernel cutting machines.

It is a still further object of the invention to provide an improved system for sweet corn processing, from ear husking through kernel cutting and delivery, in which damage to the kernels is minimized.

It is a still further object of the invention to provide an improved system for sweet corn processing in which all facilities from ear husking through kernel cutting and delivery are arranged within a volume of space, the perimeter of which is sufficiently small and the weight of which is sufficiently low that the system can be embodied in a trailable machine which can be transported on a standard flatbed trailer over roads and highways between fields without special procedures to comply with highway vehicle size and weight restrictions.

It is a still further object of the invention to provide an improved integrated sweet corn processing system wherein the waste products of processing (husks, cobs, remnant stalks, etc.) are left in the field, thereby obviating the need for special procedures, consistent with environmental protection rules and regulations, for the disposal thereof.

The sweet corn processing system provided by the present invention is supplied with freshly-picked whole ears of corn by a corn harvesting head which picks ears from a plurality (e.g., four) of rows of corn plants (the stalks thereof) at the same time. Preferably, the corn head is self-propelled and tows a machine embodying the ear processing system as a trailable apparatus in spaced, flexible relationship. The system makes use of husking rolls to which ears are delivered from the corn head via a conveyor. The system in its presently preferred embodiment uses commercially available kernel cutting machines (see U.S. Pat. Nos. 4,225,031 issued Sep. 30, 1980 and No. 4,413,722 issued Nov. 8, 1983 and No. 5,176,573 issued Jan. 5, 1993 for further information on such machines.) The husking bed, kernel cutters, conveyors, power source, and a structure for supporting and carrying same on a tracked undercarriage, which is preferably self-leveling, are all integrated in a manner to accomplish the objects of the invention, thereby providing a unique and practical solution to the problems which have heretofore prevented sweet corn cob harvesting of kernels at high speed directly in the field.

Briefly described, the system of the invention enables the husking and cutting of kernels of corn on ears growing on stalks planted in rows in a field while ejecting husks, cobs, and remnant stalks onto the field where they can be plowed under to condition the soil for subsequent plantings or can be removed for silage, etc. The system operates to receive whole, picked ears collectively, preferably from a plurality of parallel row pickers comprising a corn head harvester; to pool the received whole ears in a hopper; to husk the ears on a husking bed of known design; to distribute the ears for kernel cutting on a demand basis to an array of kernel cutting machines arranged in parallel flow; to collect the cut kernels from all of the kernel cutting machines; and to return the husks, cobs, and remnant stalks to the field. "Parallel flow" arrangement of the kernel cutting machines as used herein means that all machines draw ears with substantially equal opportunity from a common recirculating pool of ears and provide cut kernels to a common destination, each machine accepting ears until its own supply line is full, and additional ears being shunted to the next available machine. The system is preferably embodied in a single integrated machine which may be mounted on a trailable tracked undercarriage and which arranges mechanisms for cutting the kernels on an upper story and the husking bed on a lower story of a structure carried by the undercarriage. A container for cut kernels is located, preferably, near the forward end of the machine. A system of conveyors, including belt conveyors and bucket conveyors, moves the whole ears from a receiving area to a hopper supplying the husking bed and from the husking bed to the kernel cutting machines; and moves the cut kernels from the cutting machines to scalping beds for separation of unwanted pieces of cob, and from the scalping beds to a cut corn hopper. The rate of harvesting of ears can be controlled by varying the speed of travel of the harvesting machine over the ground, consistent with the kernel cutting capacity of the pooled kernel cutting machines. The total height of the machine may be such that, when placed on a standard flat bed trailer (e.g., 20" road clearance), the height of the machine is within restrictions for vehicles traveling over roads and highways, thereby obviating the need for obtaining special permits or following special routes which do not have restricted clearances for bridges, overpasses, and the like.

The foregoing and other objects, features, and advantages of the invention, as well as a presently preferred embodiment thereof, will become more apparent from a reading of the following description in connection with the accompanying drawings in which.

Figure 6:
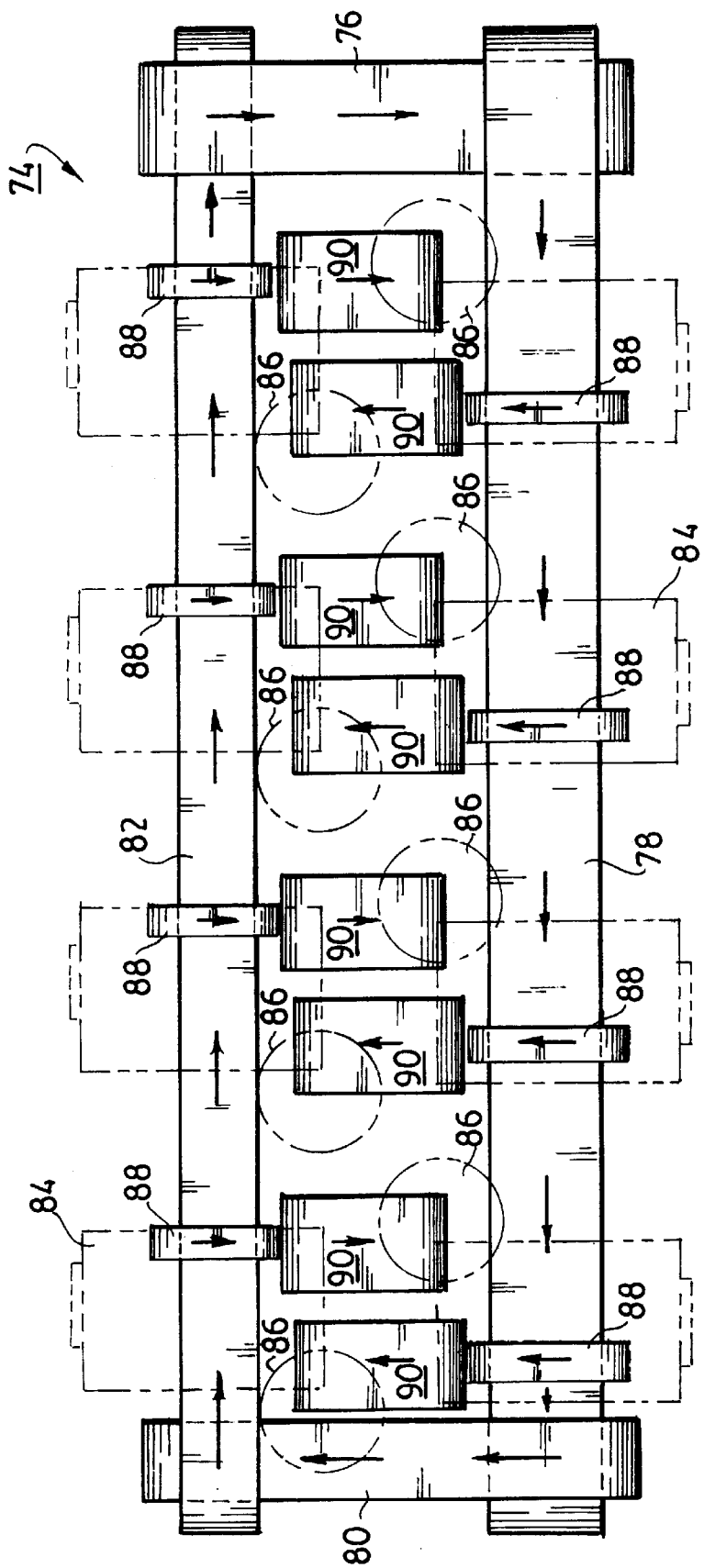
Figure 7:
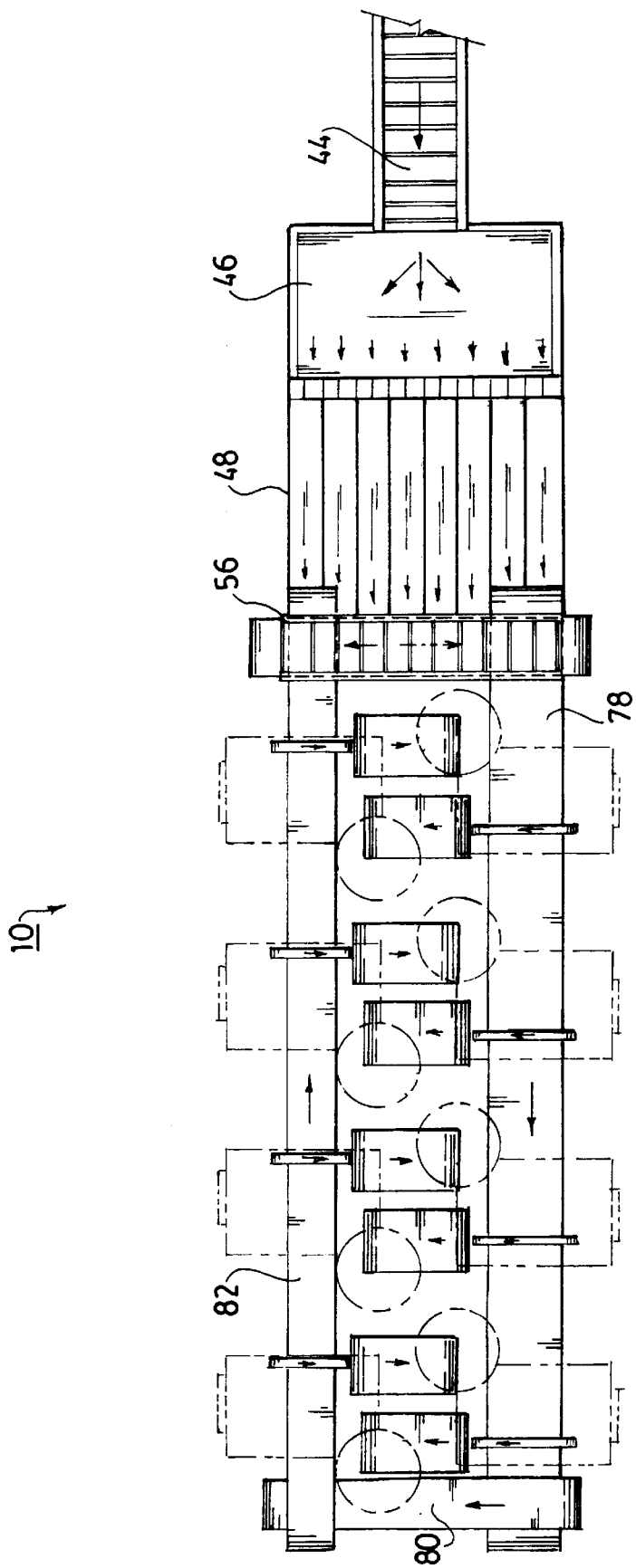
Figure 8:
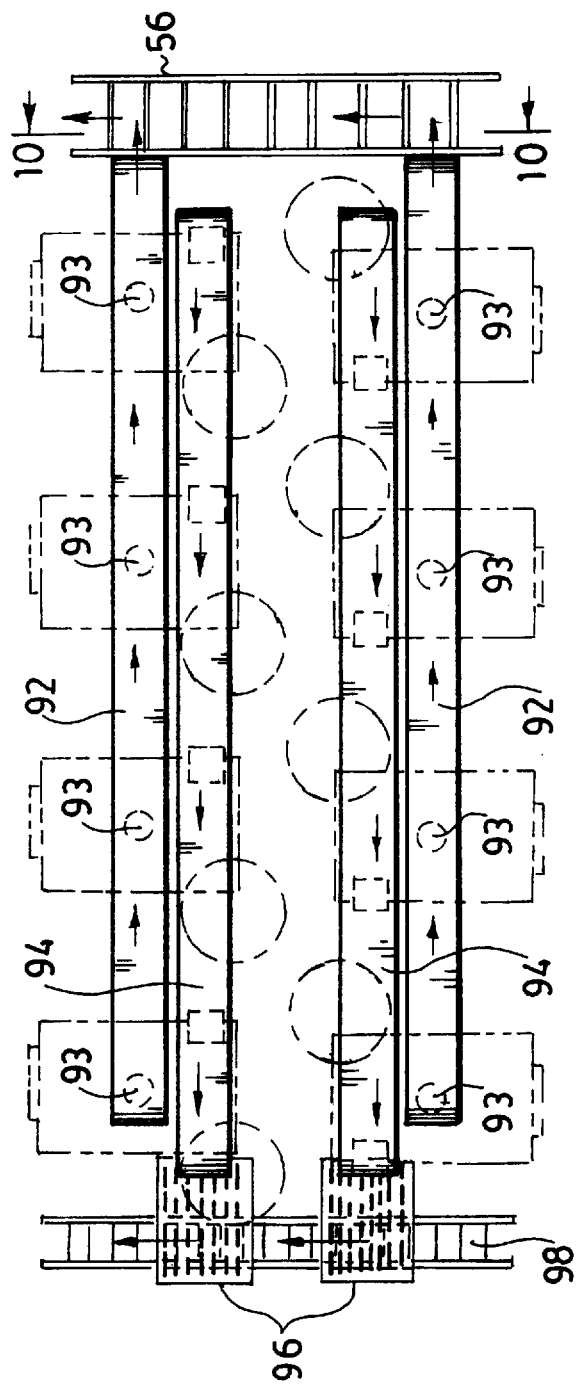
Figure 9:
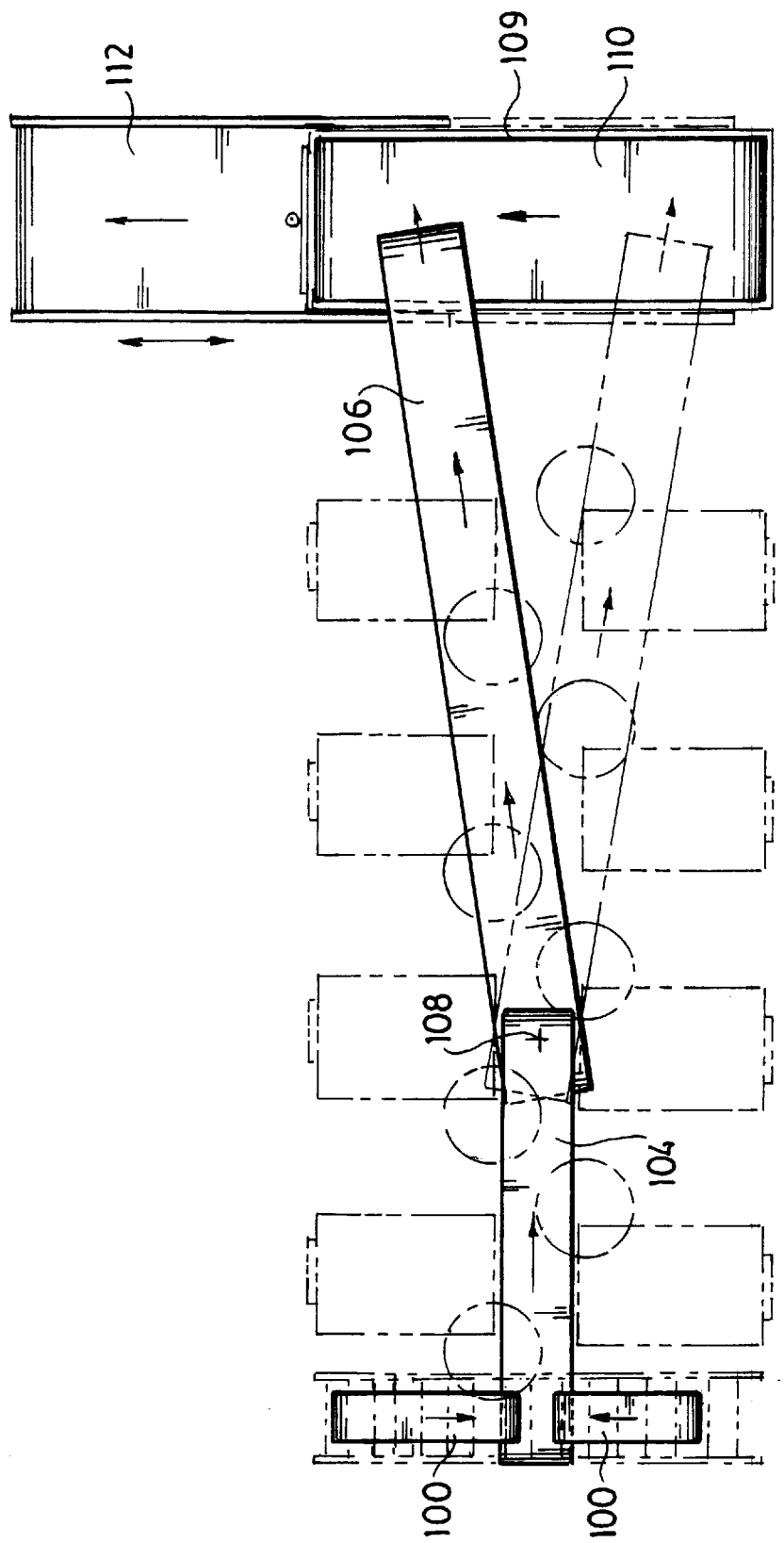
Figure 10:
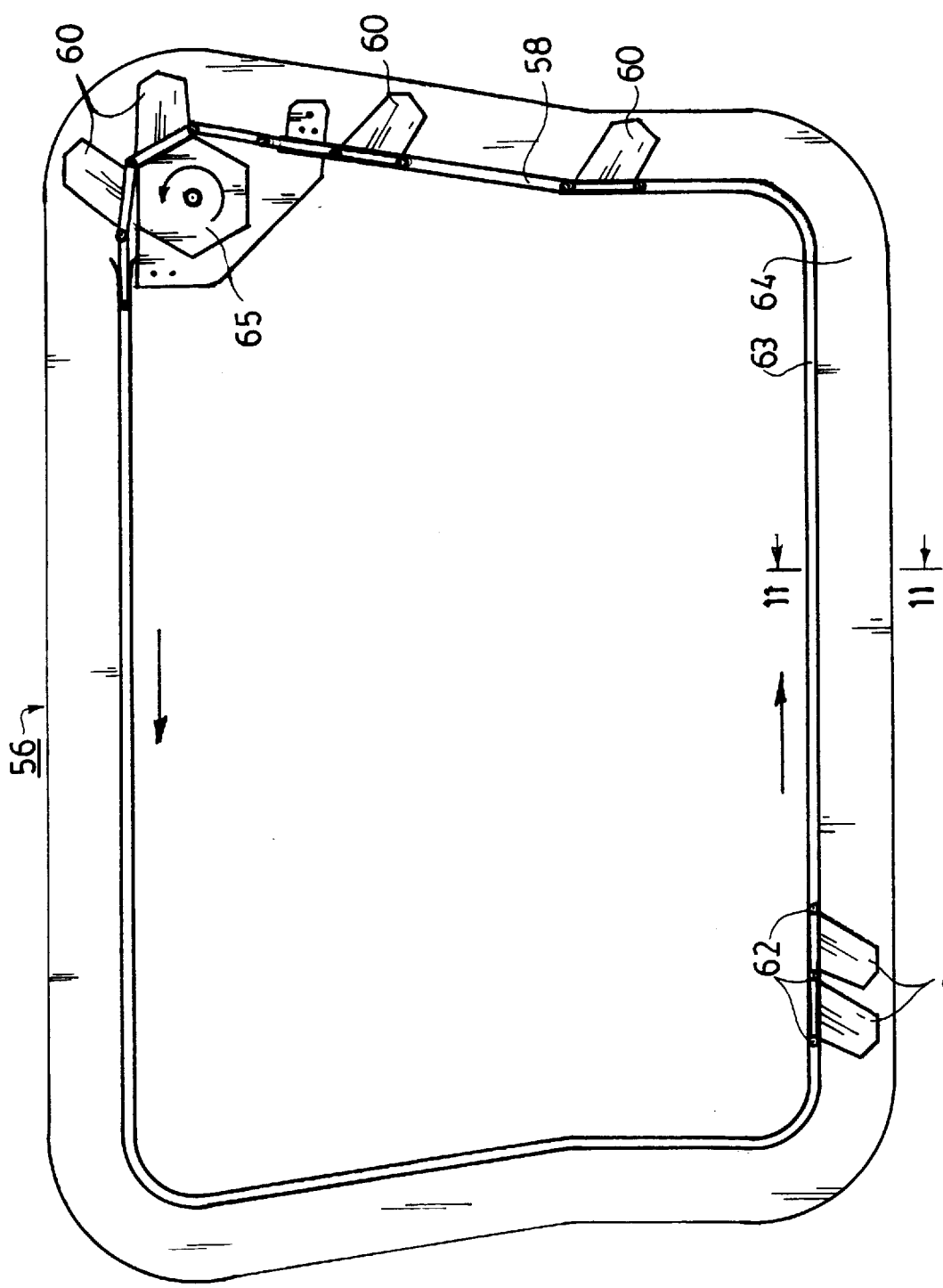
Figure 11:
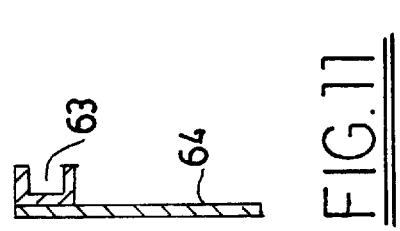
Figure 12:
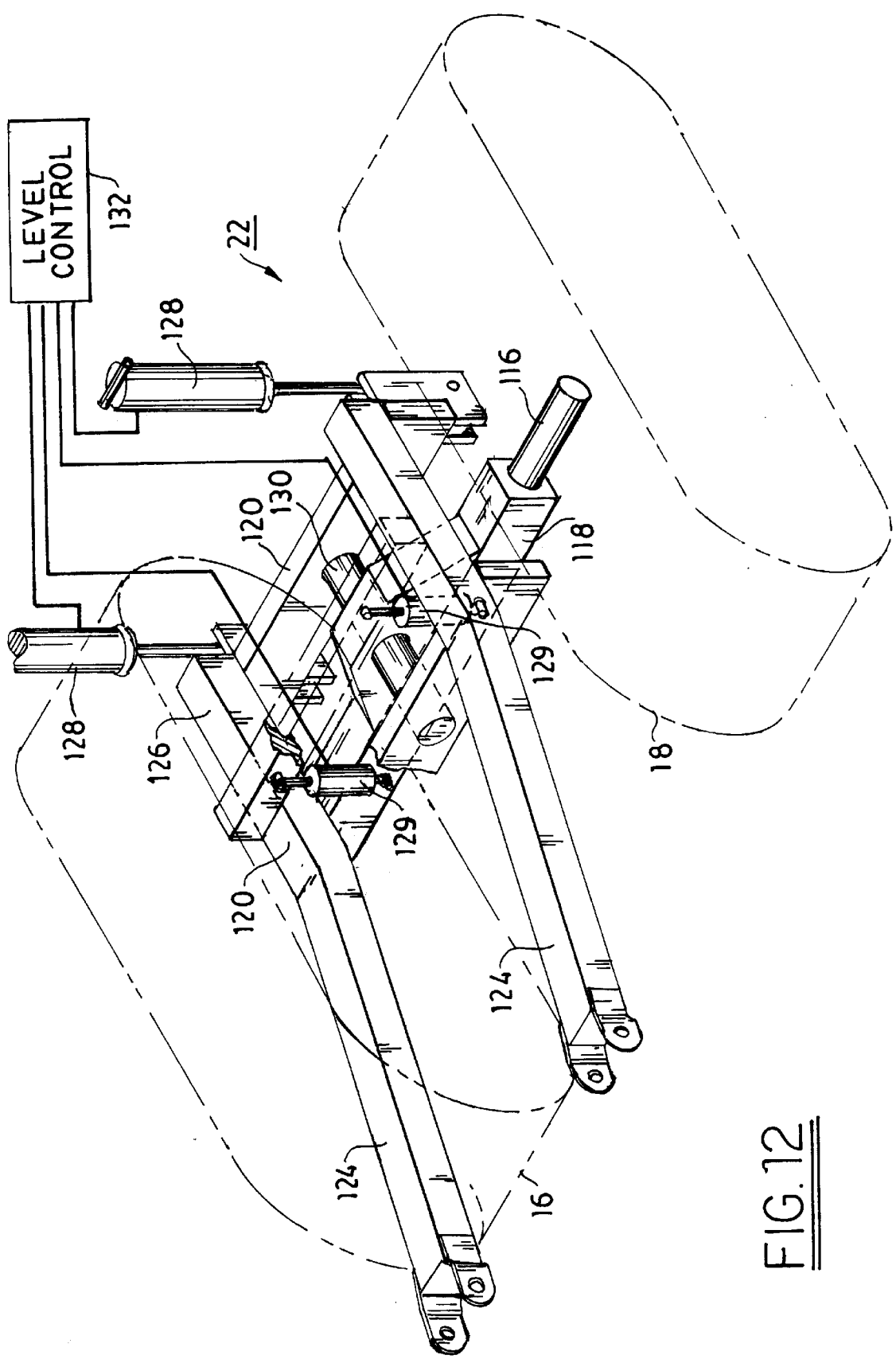
Figure 13:
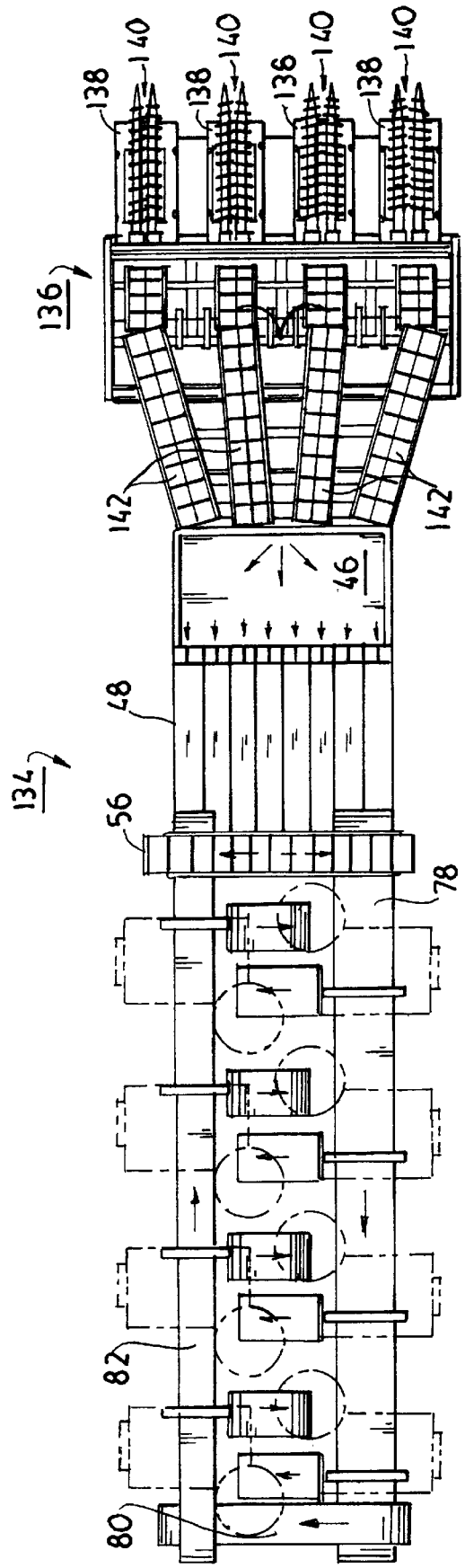

FIG. 6 is a plan diagrammatic view of an upper intermediate story, showing the arrangement of belt conveyors to supply husked ears to the kernel cutting machines, the belts being arranged with respect to the cutters to supply each of the cutters in parallel flow on demand from a common pool of ears, and each cutting machine accepting ears in its own supply line until full, whereupon additional ears are shunted to the next available machine;

FIG. 7 is a plan diagrammatic view like that of FIG. 6, showing the relationship of the whole ear supply and husking mechanisms to the upper intermediate story belt conveyors;

FIG. 8 is a plan diagrammatic view of a lower story, showing the arrangement of belt conveyors to return uncut ears to the upper intermediate story for reprocessing, to collect cut kernels from the cutting machines, to deposit cut kernels onto the scalping beds, and to collect them from below the scalping beds and raise them to an uppermost story;

FIG. 9 is a plan diagrammatic view of the-uppermost story, showing the arrangement of belt conveyors to transport cut kernels from the rear elevator conveyor to the fresh cut corn hopper;

FIG. 10 is an elevational diagrammatic cross-sectional view through the front elevator conveyor, taken along line 10—10 in FIG. 8;

FIG. 11 is a cross-sectional view of the track supporting the front elevator conveyor, taken along line 11—11 in FIG. 10;

FIG. 12 is a perspective diagrammatic view of the tracked undercarriage, showing the mechanism for keeping the processing system level on uneven terrain; and FIG. 13 is a plan diagrammatic view of an integrated picking and parallel-flow kernel cutting machine in accordance with the invention.

Figure 1:
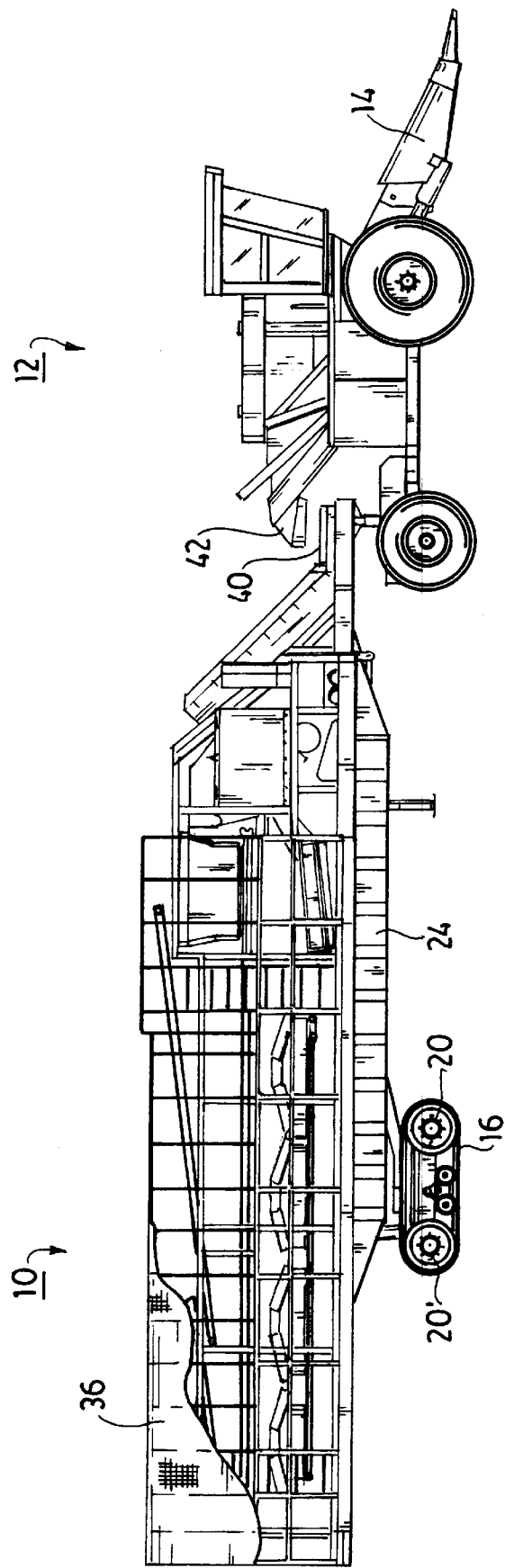
FIG. 1 is side elevational view of a processing machine embodying the invention being towed by a known self-propelled corn harvesting machine.
Figure 2:
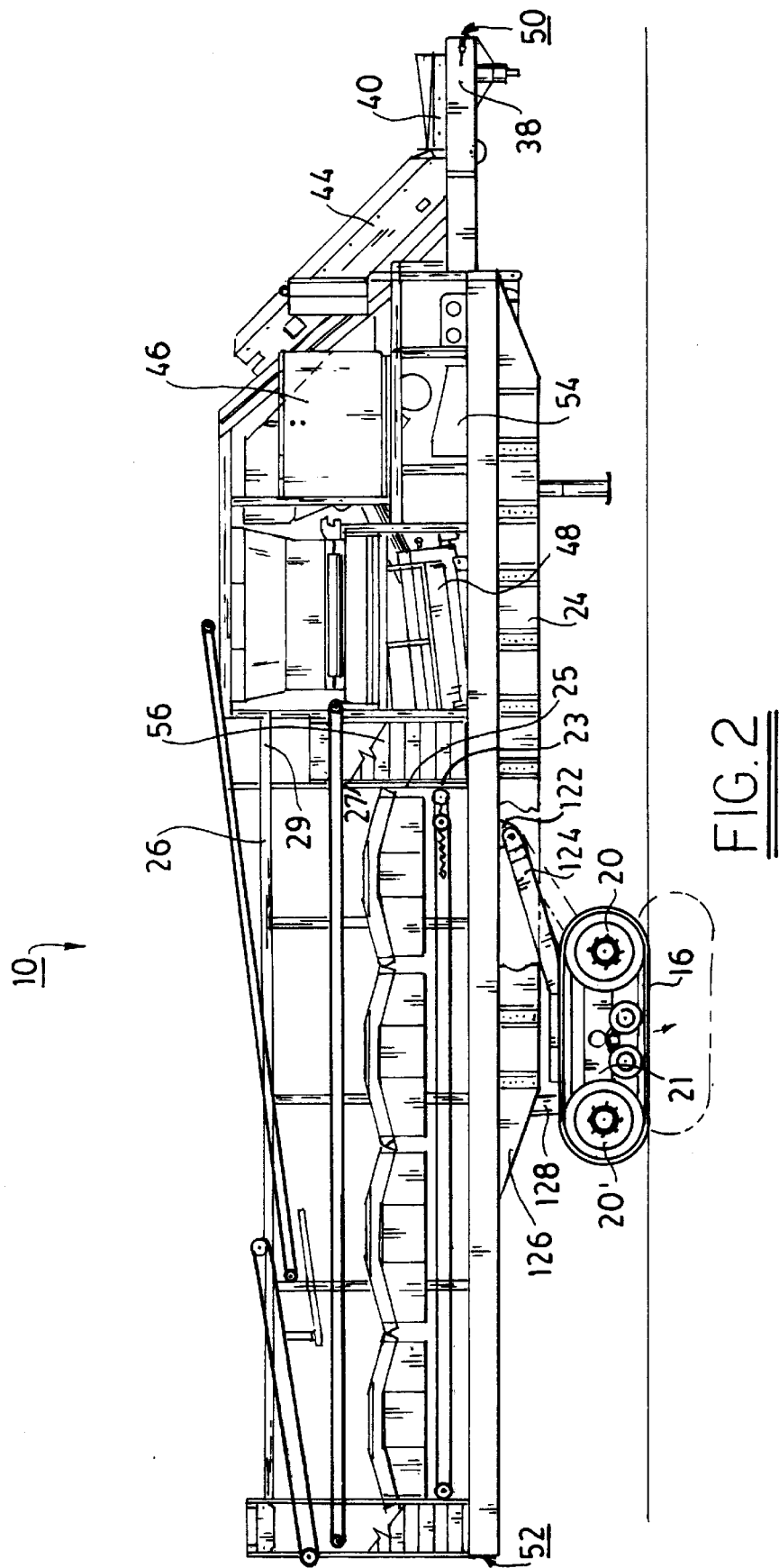
FIG. 2 is an enlarged side elevational view of the processing machine shown in FIG. 1.
Figure 3:
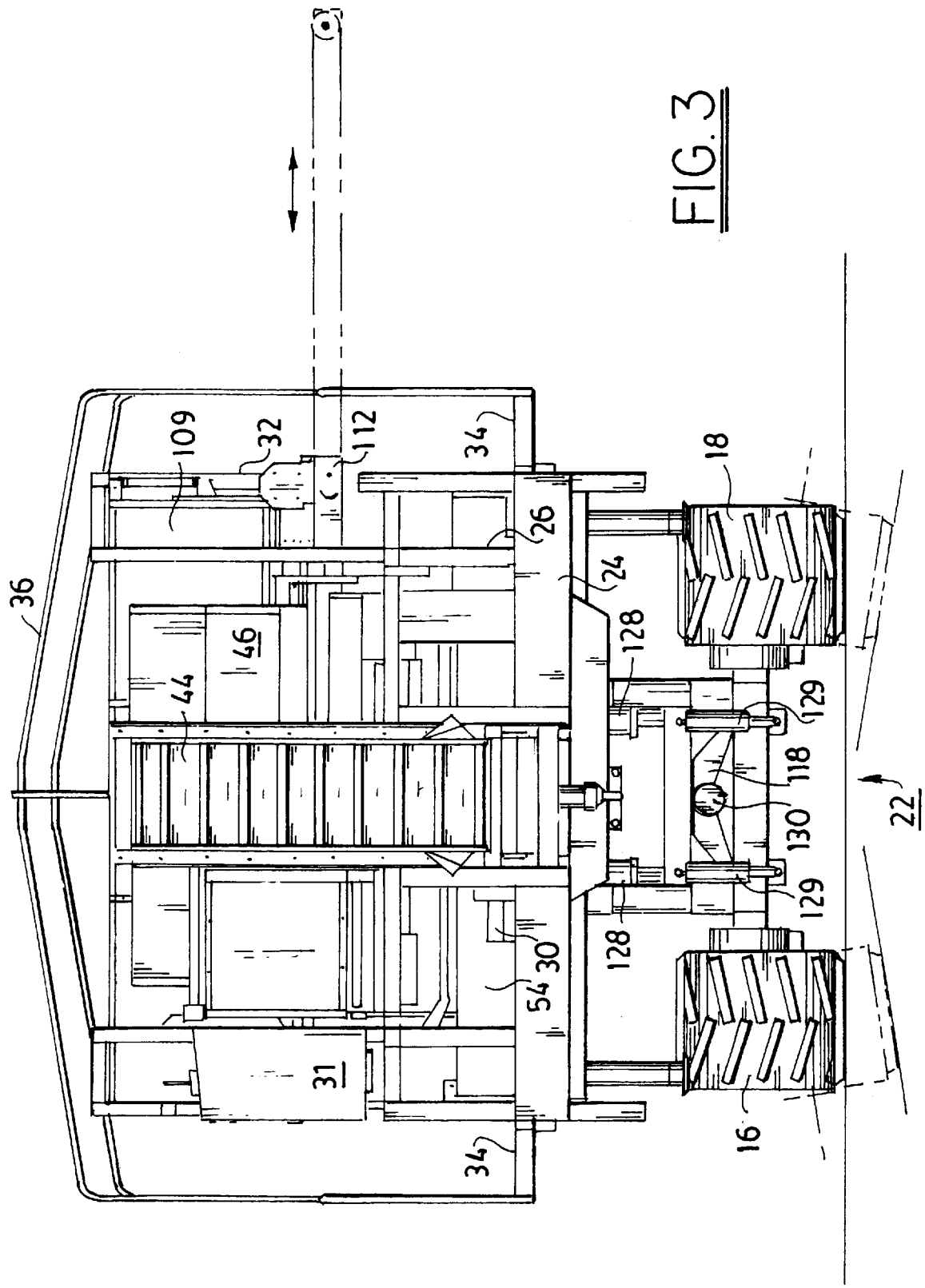
FIG. 3 is a front elevational view of the processing machine shown in FIGS. 1 and 2.

Referring to FIGS. 1–3, there is shown a ear corn processing machine 10 which incorporates the system of the invention in accordance with the presently preferred embodiment thereof. The machine 10 is coupled in spaced, ball-joint relationship to a conventional self-propelled corn harvesting machine 12 having preferably a plurality of ganged corn ear pickers 14 defining a "corn harvesting head," for example, as shown in U.S. Pat. No. 4,845,930 issued to Dow on Jul. 11, 1989. Each picker strips ears from stalks in a single planted row or corn and is sometimes referred to as a "row harvester" herein. The machine 10 is a trailable vehicle, preferably a tracked vehicle to distribute the weight of the machine over the ground and to thereby minimize soil compaction. Cleated endless tracks 16 and 18 of elastomeric material (similar to what is used in auto tires) are mounted on idler wheels 20. The wheels are mounted on beams 21 which are part of a self-leveling mechanism 22 described more fully hereinbelow (see FIG. 12). Mechanism 22 is mounted on the underside of a chassis or undercarriage 24.

A superstructure 26 is supported on the undercarriage 24 and is made up of a generally rectilinear framework of steel tubing. The tubing may be generally rectangular in cross-section. Superstructure 26 supports the principal operating components and defines a plurality of levels or stories within the machine, preferably a lowest story 23, a lower intermediate story 25, an upper intermediate story 27, and an uppermost story 29. Diesel engine 28 is mounted on the superstructure and drives hydraulic pumps 30 to pressurize hydraulic tank 31 which is connected by hydraulic lines to provide power for actuating and operating various hydraulic motors of the system. Control panel 32 contains the principal control elements for operating the system. Catwalks 34 permit operator access to the system during operation, and canopy 36 shields operators and corn being processed from direct sunlight and from rain. The canopy may be removed when the vehicle is transported over the highway and roads between fields. Because of the relationships of the components and the structural configuration of the machine, it is capable of being carried, for example, on a standard flat-bed trailer with a 20-inch road clearance. The overall height of the machine and trailer is sufficiently low to satisfy the height clearance requirements for highway travel. Thus, special overheight permits of routing for travel over highways and roads are not required.

The tongue 38 of the machine contains a loading area 40 for receiving whole ears of corn from the exit chute 42 of harvesting machine 12. A longitudinal conveyor 44 carries the ears upward and rearward from loading area 40 and deposits them into a vibrating hopper 46 (FIG. 7). Inclined husking bed 48 is mounted on the undercarriage immediately aft of hopper 46 and contains parallel husking rolls of known design (suitably 24 rolls) which turn on axes extending longitudinally of the processing machine, longitudinally meaning in a direction between the forward end 50 and the aft end 52 of the machine. The vibrating action of hopper 46 urges and meters aligned ears through an opening in the rear of the hopper and onto the husking bed. The ears gradually move down the inclined husking bed under the force of gravity, wherein the husks are removed from the ears and discarded from the underside of the husking bed.

Also carried on the undercarriage is a tank 54 which may be of the order of 200 gallons capacity which carries water which is pumped from the tank 54 and carried via hosing to be sprinkled on the husking bed and on the kernel cutting machines (see FIGS. 5–9). Water from the tank 54 may also be used to hose down and clean the various parts of the processing machine. This is desirably done every few hours to prevent starch accumulation which is undesirable and may interfere with moving parts of components of the machine.

Immediately aft of the husking bed is a first elevating conveyor, preferably a bucket elevator 56 shown in cross-section in FIG. 10. The endless belt 58 of the elevator is formed preferably of identical buckets 60 which are pivotably joined at their leading and trailing lips by pins 62. The side lips of buckets 60 slide in a channel 63 in an endless track 64 which is shown in cross-section in FIG. 11. Two such tracks, fore and aft, are provided which capture the belt of buckets therebetween. A driven polygonal sprocket 65 advances the buckets by engaging them sequentially on its faces, as shown in FIG. 10. Belt 58 is driven past the lower end of husking bed 48 and collects husked ears in buckets 60 which are upright in this region 66 of the conveyor. The buckets are raised through the vertical region 68 and are inverted through horizontal region 70 to dump the ears.

Figure 4:
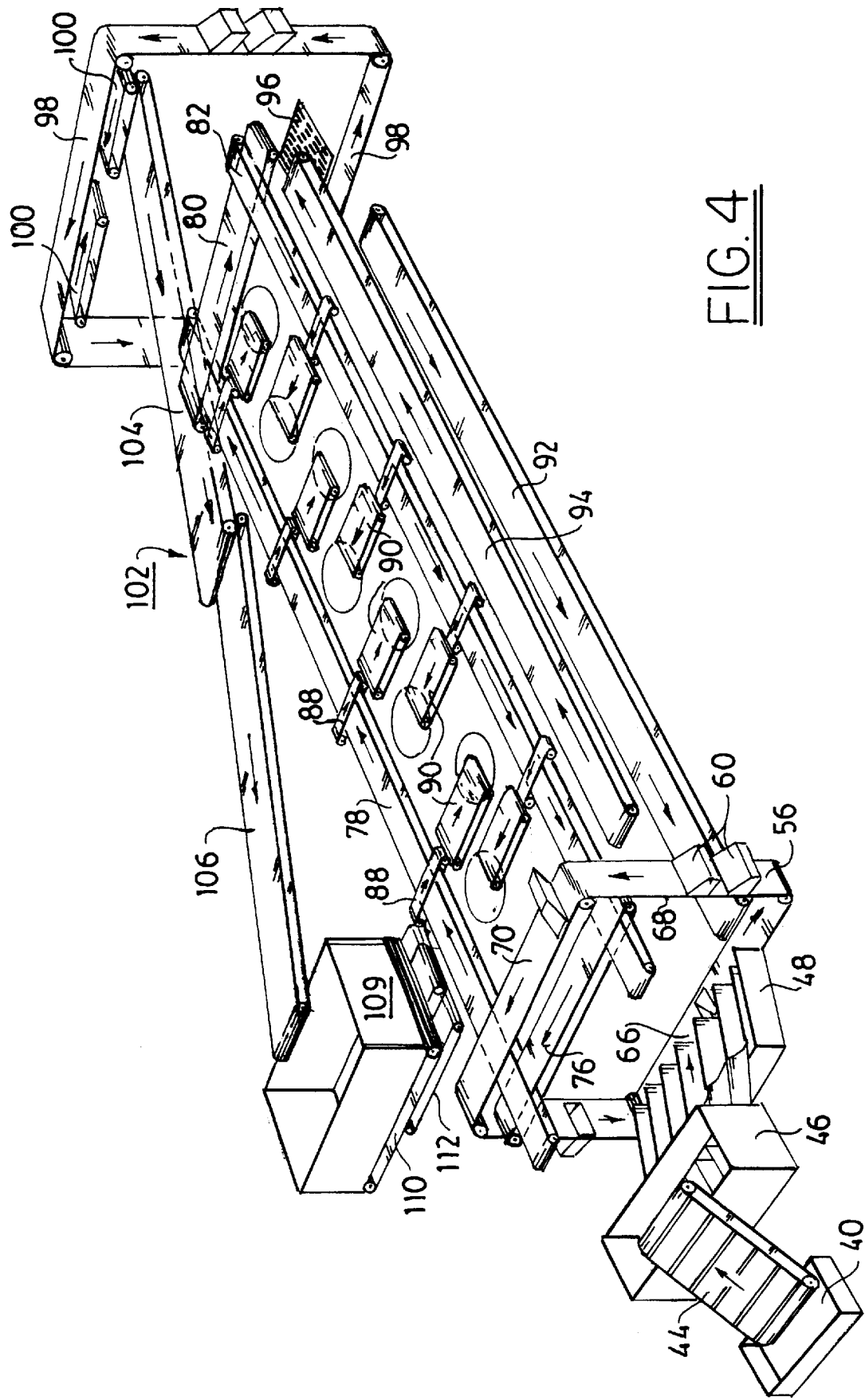
FIG. 4 is a perspective diagrammatic view of the conveyors in the machine shown in FIGS. 1–3.
Figure 5:
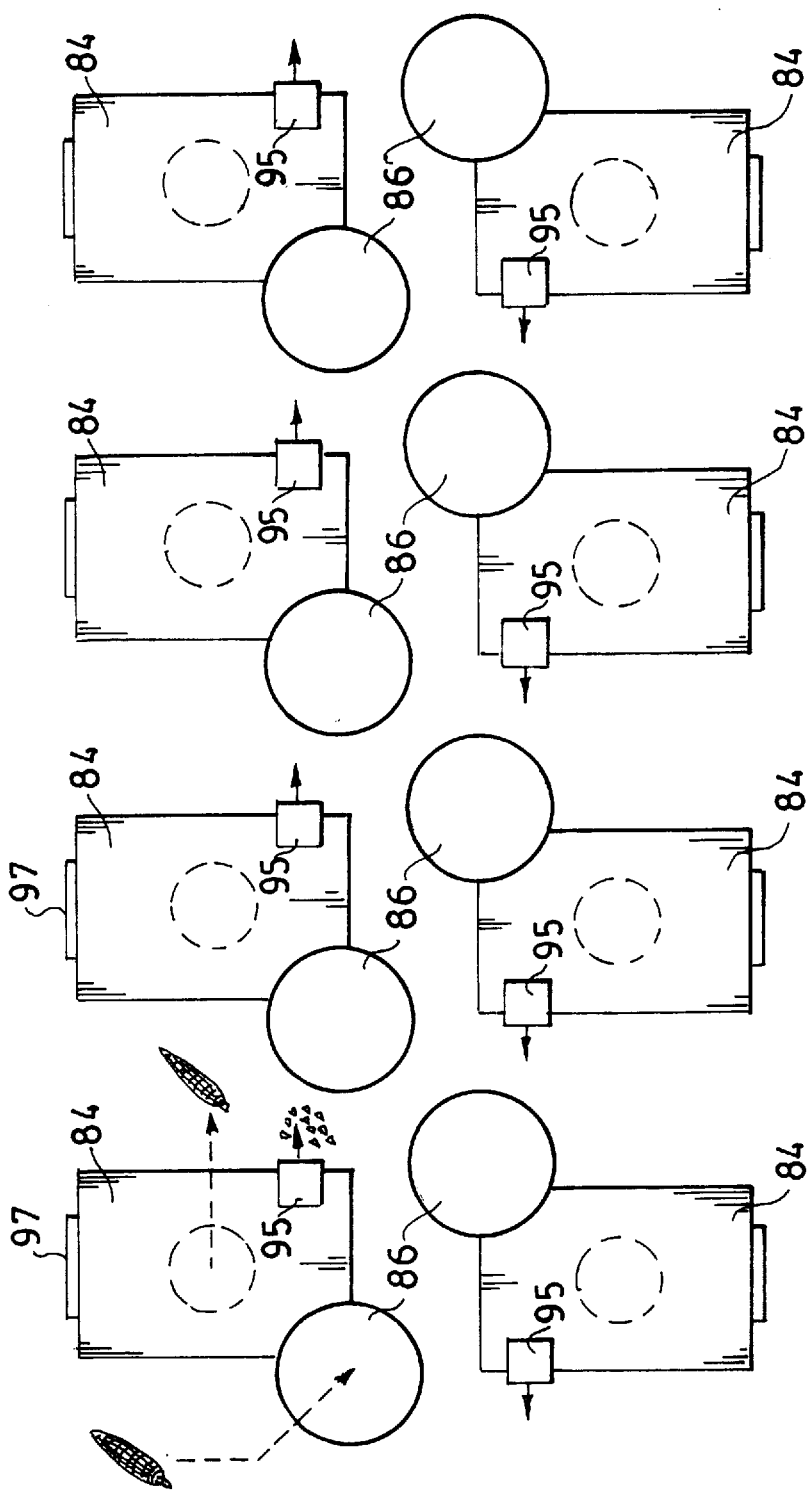
FIG. 5 is a plan diagrammatic view of a lower intermediate story, showing the layout of the kernel cutting machines.

Key elements in processing machine 10 are several systems of conveyors, utilizing both belts and buckets, to move ears and cut corn through the machine. The entire complement of belts and their relationship to each other is shown in FIG. 4 and will now be described. (For clarity in presentation of the conveyor systems, all guides, drives, and most other machine components are not shown in several of the figures.) A first system 74 of conveyors, on the upper intermediate story 27 of the machine, is shown in FIG. 6. System 74 includes four independent, overlapping belts 76, 78, 80, and 82, driven as shown in FIG. 6. Husked ears from bucket elevator 56 are deposited onto belt 76. The ears may then be transferred in sequence to belts 78, 80, 82, and back onto belt 76, the ears thus being recirculable by these four belts.

Mounted on the superstructure 26 at lower intermediate story 25 and below first conveyor system 74 are a plurality of kernel cutting machines 84, preferably eight in the present embodiment, each having an entrance hopper 86, as shown in FIGS. 5–9. Cutting machines 84 are preferably identical and may be constructed and operated substantially as described in U.S. Pat. No. 5,176,573 hereinabove incorporated by reference.

Above each hopper 86 is an ear supply system which is a further component of conveyor system 74 and includes a narrow selecting belt 88 operating transversely of either belt 78 or 82, as shown in FIGS. 4, 6, and 7. Each belt 88 can remove husked ears circulating on system 74 and supply them to its corresponding accumulating conveyor 90, which in turn dispenses ears to the hopper 86 below according to a supply signal generated as described in the '573 reference. Thus the system 74 of conveyors operating on upper intermediate story 27 serves both as a dynamic reservoir of husked corn ears and as an equal-opportunity supplier of such ears to any and all of the kernel cutters below according to the demands of the individual cutters. As each accumulating conveyor 90 becomes loaded with ears for kernel cutting, additional ears being recirculated on belts 76, 78, 80, and 82 are automatically shunted to the next selecting belt and accumulating conveyor having space available, thereby keeping each cutting machine operating continuously at its individual maximum capacity. If any cutting machine becomes inoperative, its accumulating conveyor becomes fully loaded almost immediately, so that machine becomes automatically bypassed by the distribution system until it is placed back in service.

Thus we see the advantage in the pooled configuration of the present invention over the singulated configuration of the machine disclosed in the '573 reference. In a singulated configuration, the number of kernel cutting machines must be an integral multiple of the number of row harvesters or pickers (usually unity, as in the '573 reference). Each kernel cutter, therefore, is associated with and suppliable by a single dedicated harvester. In the present improved invention, the output of the harvesters is pooled. The kernel cutters are arranged in parallel flow configuration, and machine capacity is therefore freed from the constraints of singulation. Further, the number of kernel cutters need not be an integral multiple of the number of harvesters. Although in this embodiment the ratio is 2 (eight cutting machines 84 to four row pickers 14 in corn head harvester 12), if desired the ratio could be 10:4, or 6:2, or any other multiple consistent with the above-discussed constraints on overall size and weight of the machine. A machine in accordance with the present improved design and having a cutter-to-picker ratio greater than 1 will be able inherently to pick and process corn more rapidly than a singulated machine.

Below the kernel cutters, at the lowest level 23 as shown in FIG. 8, is a second system of conveyors including a pair of belts 92 extending forward to selectively recycle any uncut ears to bucket elevator 56 for return to conveyor system 74. Uncut ears can result, for example, from malfunction of one of the kernel cutters, requiring that it be bypassed until repaired. Such ears are discharged from a kernel cutter through a duct 93. A third system of conveyors includes a pair of belts 94 extending rearward to collect the cut corn exiting the kernel cutting machines through ducts 95 and to convey it to a pair of scalping beds 96. Cobs are discharged through ducts 97 and are discarded through the undercarriage directly to the ground.

Scalping beds 96 are known dynamic strainers for separating any remaining unwanted materials, such as pieces of stalk, husk, or cob, from the stream of cut corn. The cut corn passes through the scalping beds onto a second bucket elevator 98, similar to first bucket elevator 56, which elevates the cut corn to the uppermost operating story 29, as shown in FIG. 4. A fourth system of conveyors includes a pair of transverse collecting belts 100 to collect the cut corn from elevator 98, transport it to the center of the machine, and deposit it onto a two-part longitudinal conveyor 102 leading forward in the machine. The first portion 104 of this conveyor is fixed with respect to the machine and is inclined upward. The second portion 106 is overlapped by the first portion and is horizontally pivotable about a vertical axis 108 within the first portion so that cut corn may be transferred from the first portion to the second portion and directed to a horizontally variable destination, as shown in FIGS. 4 and 9, within a cut corn hopper 109. The bottom of hopper 109 includes a conveyor belt 110 similar to that described in the incorporated reference which may be driven at the will of an operator or automatically in response to a signal to shift the pile of cut corn accumulating within the hopper to even the loading of the hopper. Hopper 109 is mounted on a retractor conveyor 112 by which it can be extended beyond the side of machine 10 to be unloaded into a suitable receptacle (not shown), for example, a portable vessel on a truck. The pivotable feature of conveyor 102 permits continued loading of hopper 109 even while unloading is proceeding.

The undercarriage 24 of the machine is self-leveling, to control performance of the husking bed which depends for optimum performance upon movement of the ears by gravity along the inclined husking rollers at a predetermined angle with respect to the horizontal, preferably about 6°. A self-leveling apparatus 22 is shown in FIGS. 2, 3, and 12. As already described, the wheels 20 supporting the endless tracks 16 and 18 are mounted on beams 21. Beams 21 are journalled on stub shafts 116 to permit independent rocking action of the track assemblies about the stub shafts in response to random roughness of terrain. Stub shafts 116 are extended from the ends of transverse beam 118. A rectilinear frame 120 is connected to undercarriage 24 at the forward end 122 by a pair of trailing arms 124, and at the rear end 12G by a pair of equal-acting hydraulic cylinders 128. Transverse beam 118 is pivotably journalled at its midpoint on a longitudinal pin 130 disposed in frame 120. A pair of opposite-acting hydraulic cylinders 129 connect beam 118 to frame 120 on opposite sides of pin 130. A level controller 132 mounted on the undercarriage senses the attitude of the undercarriage with respect to the level and actuates cylinders 128 in unison to adjust for discrepancies in pitch and cylinders 129 in opposition to adjust for discrepancies in roll.

The preferred embodiment of the invention described hereinabove is a towable, non-self-propelled vehicle which processes picked ears provided to it by a separate corn harvesting machine. This embodiment may be preferred for reasons of size and weight. However, where larger size and weight permit, self-propelled embodiments having an integral corn harvesting head with a plurality of row pickers and self-contained drive can be provided within the scope of the present invention. A diagrammatic view of such an integrated machine 134 is shown in FIG. 13. This machine is a parallel-cutting analog of an embodiment of the singulated invention described and claimed in the incorporated '573 reference, the corn head harvesting portion 136 being substantially as described therein. A plurality (e.g., four) of equivalent row pickers 138 simultaneously strip ears from parallel rows of corn plants 140.

The stalks are discarded to the field from the underside of the harvester, and the whole ears are conveyed upward and rearward by conveyors 142 and deposited in vibrating hopper 46.

Alternatively, the ears may be collected by a transverse auger (not shown) as they emerge from the row harvesters and may be conveyed rearward by a single conveyor. After reaching the hopper, the ears are then processed by methods and apparatus already described hereinabove. Alternatively, the ears may be conveyed directly from the row harvesters to the husking bed and the hopper may be omitted (not shown).

From the foregoing description it will be apparent that there has been provided an improved system for processing of picked sweet corn which can husk whole ears and cut the kernels therefrom at a higher rate than can previously-disclosed singulated machines. Variations and modifications of the herein described sweet corn processing system, in accordance with the invention, will undoubtedly suggest themselves to those skilled in this art. Accordingly, the foregoing description should be taken as illustrative and not in a limiting sense.

What is claimed is:

1. A method of continuous processing of a flow of whole corn ears in a processing machine movable along corn rows in a corn field to remove and separate the kernels from the husks and cobs thereof, comprising the steps of:

a) receiving the whole corn ears;

b) removing husks from the ears;

c) presenting each of the husked ears to any one of a plurality of kernel cutting machines;

d) shunting husked ears past any of said kernel cutting machines not ready to accept ears;

e) providing said shunted ears to any other of said kernel cutting machines; and f) removing kernels from the husked ears to leave the cobs substantially empty of kernels.

2. A method in accordance with claim 1 further comprising the steps of:

a) pooling the ears in a hopper prior to said husk removing step;

b) conveying husked ears from said husking step to said supplying step;

c) collecting the kernels from all said kernel cutting machines after said removal of the kernels from the husked ears; and d) discarding the husks and cobs.

3. A method in accordance with claim 1 wherein said supplying step includes the dynamic pooling of husked ears so that any one ear may be presented to any one of said plurality of kernel cutting machines.

4. A method in accordance with claim 1 wherein said husking step is carried out with the aid of a husking bed having husking rolls.

5. A method in accordance with claim 2 wherein said conveying step is carried out with the aid of a bucket conveyor.

6. A system for processing ears of sweet corn, comprising:
   a) an undercarriage;
   b) means mounted on said undercarriage supporting it for movement along the ground;
   c) a husking bed mounted on said undercarriage for receiving whole ears of corn and removing the husks therefrom;
   d) a plurality of kernel cutting machines mounted on said undercarriage for removing kernels from husked ears of corn;
   e) means for distributing husked ears to said cutting machines so that any one ear may be presented to any one of said plurality of kernel cutting machines, said distributing means including means for shunting husked ears past any of said kernel cutting machines not ready to receive said ears and for presenting said shunted ears to any other of said kernel cutting machines, said ears being thus recirculable by said distributing means past all of said cutting machines as needed until accepted for kernel cutting by any of said machines; and
   f) means for collecting kernels cut by said cutting machines.

7. A system in accordance with claim 6 further comprising a superstructure on said undercarriage providing a plurality of stories, and wherein said distributing means includes means for elevating husked ears from said husking bed to said kernel cutting machines.

8. A system in accordance with claim 7 wherein said elevating means includes a bucket elevator.

9. A system in accordance with claim 8 wherein said bucket elevator comprises:
   a) an endless track mounted on said superstructure transversely of said processing machine and immediately aft of said husking bed, said track having a channel;
   b) an endless conveyor belt slidably mounted on said endless track, said belt including a plurality of buckets, adjacent of said buckets being flexibly joined, each of said buckets having a lip adapted to be received by and to slide in said endless track channel, said buckets in a lower portion of said track being disposed to receive husked ears emerging from said husking bed, and said buckets in an upper portion of said track being inverted to allow said ears to fall from said buckets; and
   c) a driven polygonal sprocket, the faces of which engage said buckets sequentially in driving relationship.

10. A system in accordance with claim 6 further comprising means for directing husks and cobs from which kernels have been cut out of said machine.

11. A system in accordance with claim 6 further comprising a vibrating hopper for pooling said whole ears of corn and metering said ears to said husking bed.

12. A system in accordance with claim 11 further comprising means for receiving and conveying whole ears to said vibrating hopper.

13. A system in accordance with claim 7 further comprising means for selectively recycling ears from said cutting means back to said elevating means.

14. A system in accordance with claim 6 further comprising tracks on said undercarriage.

15. A system in accordance with claim 6 further comprising means for self-leveling of said undercarriage.

16. A system in accordance with claim 15 wherein said self-leveling means comprises:
   a) a frame;
   b) a pair of trailing arms rigidly connected to said frame and pivotably connected to said undercarriage to allow the said frame to be pivotably varied in spacing from said undercarriage;
   c) a first pair of hydraulic cylinders, each operationally connected to said frame and said undercarriage, actuation of which in unison can change said spacing between said frame and said undercarriage to change the angle of pitch of said undercarriage with respect to the ground;
   d) a transverse beam having a stub shaft at each end and pivotably connected at substantially its center to said frame;
   e) a pair of longitudinal beams, mounted for vertical oscillation on opposite ones of said stub shafts, and each supporting a pair of wheels and a continuous track for supporting and moving said machine over the ground;
   f) a second pair of hydraulic cylinders operationally connected to said frame and said beam on opposite sides of said pivotable connection, actuation of which cylinders in opposition causes said beam to be pivoted about said pivotable connection to change the angle of said beam with respect to said undercarriage to change the angle of roll of said undercarriage with respect to the ground; and
   g) a level controller which senses the attitude of said undercarriage with respect to horizontal and adjusts the stroke of said first and second pairs of hydraulic cylinders to dynamically maintain said undercarriage at a desired attitude of pitch and roll with respect to horizontal.

17. A system in accordance with claim 6 wherein each one of said kernel cutting machines has a first port for discharging cut corn kernels and a second port for discharging cobs.

18. A system in accordance with claim 6 wherein said means for distributing said husked ears to said kernel cutting machines comprises a system of intersecting crossed conveyors.

19. A system in accordance with claim 18 wherein said conveyor system comprises:
   a) a plurality of recirculating conveyors for receiving husked ears from said bucket elevator and recirculating the ears until removed for kernel cutting, each of said conveyors being overlapped by a preceding conveyor and overlapping a succeeding conveyor;
   b) a plurality of selecting conveyors for removing ears for cutting from said recirculating conveyors, each of said selecting conveyors being dedicated to one of said kernel cutting machines; and
   c) a plurality of accumulating conveyors for receiving and accumulating ears selected by said selecting conveyors, and for metering the accumulated ears to the cutting machines, each of said accumulating conveyors being dedicated to one of said cutting machines.

20. A system in accordance with claim 6 wherein said collecting means comprises:
   a) at least one conveyor for receiving and transporting cut corn from said kernel cutting machines;
   b) at least one scalping bed for separating cut corn kernels from cob parts and husks;
   c) at least one conveyor for receiving cut corn from said scalping bed;
   d) a bucket elevator for receiving cut corn from said scalping bed conveyor and raising the cut corn to an upper story;

e) an articulated conveyor for receiving cut corn from said bucket elevator; and f) a cut corn hopper for receiving and storing cut corn from Unsaid articulated conveyor.

21. An integrated system in a machine movable along corn rows in a corn field for picking and processing ears of sweet corn, comprising:

a) an undercarriage;

b) means mounted on said undercarriage for supporting it and moving it along the ground;

c) a corn head harvester mounted on a forward portion of said undercarriage and having a plurality of row pickers for stripping corn ears from a plurality of rows of planted corn substantially simultaneously;

d) a husking bed mounted on said undercarriage for receiving whole ears of corn from said corn head harvester and removing the husks therefrom;

e) means for conveying the ears from said corn head harvester to said husking bed;

f) a plurality of kernel cutting machines mounted on said undercarriage for removing kernels from husked ears of corn;

g) means for distributing husked ears to said cutting machines so that any one ear may be presented to any one of said plurality of kernel cutting machines, said distributing means including means for shunting husked ears past any of said kernal cutting machines not ready to receive said ears and for presenting said shunted ears to any other of said kernal cutting machines, said ears being thus recirculable by said distributing means past all of said cutting machines as needed until accepted for kernal tting by any of said machines; and h) means for collecting kernels cut by said cutting machines.

22. A system in accordance with claim 21 wherein the number of kernel cutting machines is larger than the number of row pickers.

* * * * *